July 29, 1947.  F. J. AVES  2,424,575

LIGHT SHUTTER AND DIMMER

Filed June 7, 1944

Inventor
Fred J. Aves

Patented July 29, 1947

2,424,575

UNITED STATES PATENT OFFICE 2,424,575

LIGHT SHUTTER AND DIMMER

Fred J. Aves, Beverly Hills, Calif., assignor to Vincent A. Marco, Los Angeles, Calif.

Application June 7, 1944, Serial No. 539,129

4 Claims. (Cl. 240—8.16)

This invention relates to an improved device for controlling the emission of light from an electric signal light or the like. More particularly, it relates to a combined shutter and dimmer construction for cooperative association with a panel light or signal light to obtain a positive mechanical control of the light emission from an electric lamp.

It has become customary in many arts to provide electric signal and indicator lights at predetermined positions to afford indication of a condition or condition of operation at a point remote from the indicator. While there are many ordinary uses of such tell-tale lights, in many cases it is advantageous to have full control of the light emission from the lamp. For example, in the use of signal lights on the panels of aircraft or other vehicles, where the light is positioned in front of the pilot or operator, it is necessary at times to have full light emission, whereas, at other times, a predetermined light emission or a dimmed condition is necessary. It is one of the main objects of the invention to provide an improved structural arrangement for obtaining a positive mechanical control of light emission from a signal or pilot light.

A further object of the invention is the provision of a structure for cooperation with an electric light fixture, and wherein a novel shutter arrangement controls the direct emission of light and a filter is employed for dimming.

Further objects include the provision of an improved light shutter and dimmer in a unitary structure, and the provision of a unitary device which can be easily and economically manufactured.

These and other objects and advantages are obtained by the structural arrangements hereinafter described in detail in the specification and illustrated in the accompanying drawing, in which—

Figure 1:
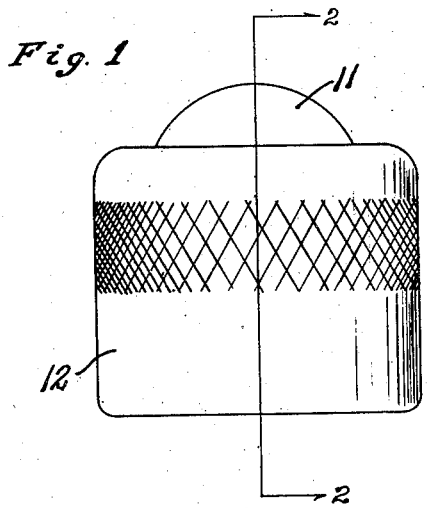
Figure 1 is a view in elevation of a shutter and dimmer unit in accordance with the invention.
Figure 2:
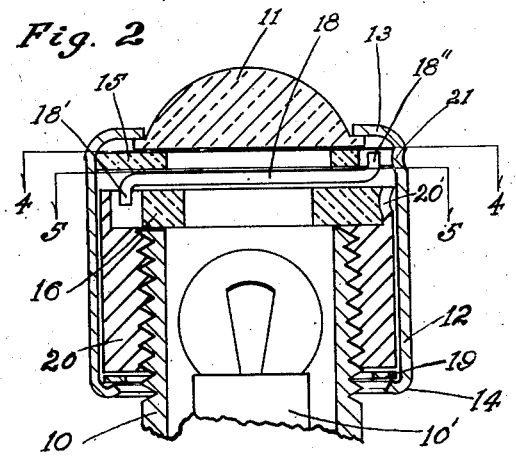
Figure 2 is a vertical central cross section taken on the line 2—2 of Fig. 1, showing also in fragmentary section a cooperating light structure.
Figure 3:
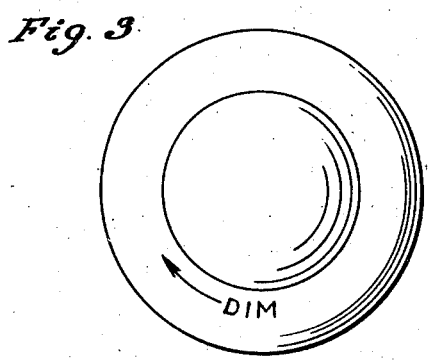
Figure 3 is a top plan view of the device of Fig. 1.
Figure 4:
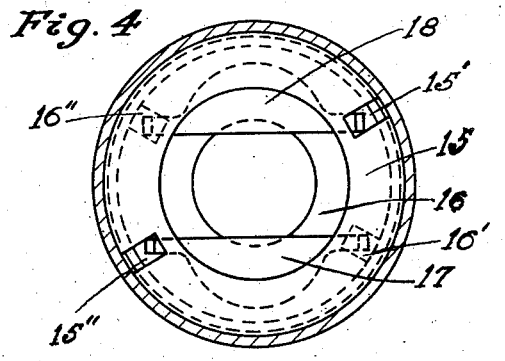
Figure 4 is a horizontal section taken on the line 4—4 of Fig. 2, looking in the direction of the arrows.
Figure 5:
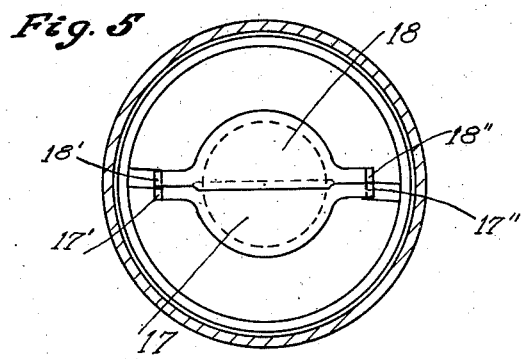
Figure 5 is a horizontal section on line 5—5 of Fig. 2, looking in the direction of the arrows.

With particular reference to the drawing and details thereof, the light shutter and dimmer assembly is illustrated as a unit and in cooperation with a panel light structure 10 and an electric signal light 10' housed by the structure. The light fixture, which does not form part of the invention except for its cooperation with the shutter and dimmer unit, comprises a cylindrical housing for the lamp having an exteriorly threaded portion for cooperative association with the shutter and dimmer assembly.

The shutter and dimmer unit consists of a lens 11 of suitable transparent or translucent material mounted in one end of a cylindrical opaque member or shell 12, having at its lens mounting end an annular inwardly-directed flange 13 for cooperation with the peripheral portion of the lens to position and retain the lens in the shell. Underlying the lens is a light shutter assembly which comprises, an upper shutter operating ring 15 with peripheral recesses 15' and 15" diametrically opposed, a lower shutter operating ring 16 with diametrically opposed peripheral recesses 16' and 16", and shutter members 17 and 18 positioned between the operating rings and having lateral extensions 17' and 17", and 18' and 18" respectively, with the extensions on each of the shutter members reversely bent to provide oppositely extending lugs adapted to enter the peripheral slots of the rings. The assembly is completed by an annular internally threaded member 20 and an underlying spring 19 telescopically received in the lower end of the cylindrical shell 12 and the lower end of the shell 12 is flanged inwardly to retain the parts in unit assembly. The upper operating ring 15 is staked to the outer shell 12 at 21 so as to be movable with the shell. The lower ring 16 is positioned in a recessed end of the member 20 and is staked thereto at 20' so as to maintain a fixed position with respect to said member.

Shutter operating rings 15 and 16 are made of suitable translucent material so as to be able to pass therethrough a dim light from the lamp 10'. Shutter members 17 and 18 are relatively thin opaque members having substantially semi-circular central body portions and straight meeting edges. While it is not necessary with precision structures, the shutter members may be provided, if desired, with overlapping meeting edges for additional insurance against light leakage when the members are in their closed position. The area of the shutter members is such that in the closed position of the shutter, with the straight edges of the members in abutment, the shutter effectually closes the light aperture through which the light normally passes from the lamp 10' to the lens. However, the shutter members are of insufficient area to cover the operating rings 15 and 16, which due to their translucent characteristic serve as light filters allowing a narrow band of dimmed light to pass around the outer edges of the shutter members to be visible in the edge portion of the lens. The shutter members are arranged for lateral movement between the operating rings with the straight edge portions of the members maintaining parallelism throughout the movement. In the full open position of the members, the light path through the unit is unobstructed, whereas the light path through the operating rings around the shutter is substantially restricted. Thus, from the arrangement, it will be seen that in the full open position of the shutter all of the light is directed toward the lens aperture. From the open position to the closed position it is possible to obtain a controlled passage of light directly to the lens by effecting relative movement of the filter rings 15 and 16, by rotating the shell 12 with respect to the screw threaded mounting member 20.

In operation, the unit is connected to a panel light structure with the threaded member 20 forming a fixed connection. The shell 12 is sufficiently large to provide for rotation of the shell with respect to the member 20. The operating filter ring 15 is staked to the shell 12 and the operating filter ring 16 is staked to the member 20. The diametrically opposite radially extending recesses in the peripheries of the rings 15 and 16 receive the oppositely bent portions of the extensions of the shutter members and are of sufficient depth to allow movement of the lugs on the shutter members in the slots of the rings. Therefore, when the cylindrical casing 12 is rotated around the member 20 it causes relative movement between the operating filter rings 15 and 16 thereby effecting lateral movement of the shutter members 17 and 18 with their straight edge portions remaining in parallelism throughout the movement. From this, it will be seen that the passage of light through the device can be controlled by an operator as desired, and in accordance with the degree of rotational movement of the shell 12.

The operating rings 15 and 16 may be of any translucent material the selection of which is dependent on the amount of light required to pass through the rings. While the shutter and dimmer arrangement has been illustrated in connection with a panel light it will be recognized that other forms of structure may be used.

While the invention has been described in connection with the preferred embodiment thereof, it is to be understood that the words which have been used are words of description rather than of limitation, and that the practice of the invention within the scope of the appended claims, may be resorted to without departing from the true scope and spirit of the invention in all its aspects.

I claim:

1. In a filter and dimmer unit for attachment to a signal light, a cylindrical housing having a lens in one end thereof and a movable connecter at the other end for connecting the device to a signal light, a filter and shutter assembly within the housing for controlling the light passage therethrough, said assembly comprising two translucent shutter operating rings having diametrically opposed radial slots, and a plurality of laterally movable shutter elements positioned between said rings and having a lug extension engaging in a slot in each of said rings, and means for effecting relative rotational movement of the rings to effect lateral movement of the shutter members.

2. In a device of the character described, an apertured housing for passage of a light beam therethrough, means within said housing for controlling the size of the light beam passage from full open position to a completely closed position, said means comprising a combined light filter and shutter consisting of relatively movable translucent shutter operating members and a plurality of laterally movable shutter elements between said members, and means including pin and slot connections between said shutter elements and operating members, whereby relative rotation of the operating members effects lateral movement of the shutter members to open and close the light aperture.

3. In combination with a signal light having a housing and an electric lamp therein, a combined light shutter and dimmer detachably connected with said housing and apertured for passage of light rays from said lamp, said shutter and dimmer comprising a rotatable opaque shell, a plurality of translucent shutter operating rings mounted in said shell, a plurality of laterally movable shutter members positioned between said rings, and means for producing relative movement of said rings and lateral movement of said shutter members to control the passage of light through the light aperture, said means including a lost motion connection between the rings and shutter members.

4. A light control device comprising a housing having an opening therethrough for passage of light, a light shutter for controlling the passage of light through the housing, said shutter comprising a pair of relatively thin opaque substantially semi-circular laterally movable shutter elements having straight meeting edges, and a plurality of translucent shutter operating members positioning said shutter elements therebetween, loss motion connections between said shutter elements and said operating members whereby relative rotational movement of the operating members produces lateral movement of the shutter elements to open and close the light passage through the housing, said shutter elements being smaller than said operating members whereby in the closed position of the shutter elements the translucent operating members serve as a filter to pass dimmed light around the outer edges of the shutter elements, and means for effecting relative rotational movement of the operating members from rotational movement of the housing.

FRED J. AVES.

REFERENCES CITED

The following references are of record in the file of this patent:

UNITED STATES PATENTS

| Number | Name | Date |
|---|---|---|
| 2,324,384 | Grimes | July 13, 1943 |
| 2,361,765 | Grimes | Oct. 31, 1944 |
| 2,192,345 | Fonte | Mar. 5, 1940 |
| 2,337,746 | Garstang | Dec. 28, 1943 |
| 1,263,234 | Hanson | Apr. 16, 1918 |

FOREIGN PATENTS

| Number | Country | Date |
|---|---|---|
| 25,028 | Great Britain | 1912 |

OTHER REFERENCES

"Littelfuse Signalette," 2 pages rec'd in U. S. Patent Office Nov. 12, 1943, by Littelfuse Inc. of El Monte, Cal.